United States Patent [19]

Takahashi et al.

[11] Patent Number: 4,875,120
[45] Date of Patent: Oct. 17, 1989

[54] HEAD DRIVING APPARATUS WITH COARSE AND FINE ADJUSTMENTS

[75] Inventors: Kiyoshi Takahashi, Tokyo; Masayuki Noda, Kanagawa, both of Japan

[73] Assignee: Sony Corporation, Tokyo, Japan

[21] Appl. No.: 232,780

[22] Filed: Aug. 16, 1988

[30] Foreign Application Priority Data

Aug. 18, 1987 [JP] Japan ............................. 62-204334
Oct. 31, 1987 [JP] Japan ......................... 62-167547[U]

[51] Int. Cl.⁴ ............................................. G11B 5/54
[52] U.S. Cl. ................................. 360/106; 360/78.05; 360/109
[58] Field of Search ............ 360/104, 106, 109, 78.04, 360/78.05, 97.01, 99.01

[56] References Cited

U.S. PATENT DOCUMENTS

4,246,618  1/1981  Bauer ................................. 360/106
4,455,583  6/1984  Schultz ............................ 360/78.05
4,630,145  12/1986  Thompson et al. ................ 360/106

Primary Examiner—Stuart N. Hecker
Assistant Examiner—David J. Severin
Attorney, Agent, or Firm—Lewis H. Eslinger; Jay H. Maioli

[57] ABSTRACT

A head driving apparatus for displacing a magnetic head comprises a plurality of slender rods, the respective ends of which are fixed to one another. The slender rods are twisted together by a motor or the like which is connected to ends of the rods thereof, so that the other ends of the slender rods are finely displaced against the force of an urging element, such as a coiled spring. Thus, it is easy to make the apparatus operating noise not noticeable and the motor capacity small.

10 Claims, 9 Drawing Sheets

HEAD DRIVING APPARATUS WITH COARSE AND FINE ADJUSTMENTS

BACKGROUND OF THE INVENTION

1. Field of the Invention

This invention relates generally to a head driving apparatus, and more particularly is directed to the fine adjustment device thereof, that is, the device for finely displacing a magnetic head which is driven by such apparatus.

1. Description of the Prior Art

Disclosed in U.S. Pat. No. 4,630,145 is a head driving apparatus, in which a lead screw that is driveably connected to a movable head carriage, is rotatively driven by a coarse stepper motor, and axially displaced by a fine stepper motor so as to finely adjust head positions with respect to the track of a disk.

On the shaft of the fine stepper motor, a second lead screw is provided. One end of a lever is moved by the second lead screw, and by the other end of the lever, the first lead screw is axially displaced against the force of a spring.

However, to smoothly transmit driving forces from the second lead screw to the one end of the lever, a certain backlash is needed between them, so that the fine displacement of the head becomes difficult due to play produced at the time when the fine stepper motor is changed from normal rotation to reverse rotation, or vice versa.

To avoid such a backlash, if the lever is partly made of elastic material, the elastic portion of the lever must hinder the accurate transmission of the driving forces, so that the fine displacement of the head becomes likewise difficult.

Furthermore, in the apparatus having such a second lead screw, the output of the fine stepper motor must become rather large, so that it is difficult to make the motor small in size and high in rotation.

OBJECTS AND SUMMARY OF THE INVENTION

Accordingly, it is an object of the present invention to provide a head driving apparatus for a recording and/or reproducing equipment which avoids the above described problems associated with the prior art More specifically, it is an object of this invention to provide a head driving apparatus for a recording and/or reproducing equipment in which a head can be accurately displaced without any hysteresis, when it is driven.

A further object of the invention is to provide a head driving apparatus for a recording and/or reproducing equipment in which no noise is made when a head is finely displaced, so that a noiseless apparatus is obtained.

Still a further object of the invention is to provide a head driving apparatus for a recording and/or reproducing equipment in which the capacity of drive means, such as a motor or the like is made small, so as to enable a small-sized motor to finely displace a head at high speed.

Still another object of the invention is to provide a head driving apparatus for a recording and/or reproducing equipment in which a fine adjustment device which displaces a head through intertwining a plurality of slender rods, is simply and easily assembled, and also, corrections of the length of the slender rods after assembling of the device are simply and easily made.

In accordance with an aspect of this invention, the head driving apparatus of this invention comprises a plurality of slender rods, such as wires, both ends of which are fixed to one another; rotating means, such as a motor or the like for turning one fixed end of the slender rods; urging means, such as a spring or the like for urging the other fixed end of the slender rods in a direction for stretching the slender rods; and holding means, such as a lever or the like for holding the other fixed end of the slender rods in a nonrotatable state, wherein the one fixed end of the slender rods is turned by the rotating means to intertwine the slender rods with one another, so that the other fixed end of the slender rods is finely displaced against the force of the urging means.

According to the head driving apparatus of this invention, fine displacements of the head are obtained by means of intertwining the plurality of slender rods with one another by the help of the rotating means, such as a motor or the like. Therefore, the apparatus has no backlash due to hysteresis produced at the time of changing driven senses thereof. Further, as the torque necessary for intertwining the slender rods depends upon the rigidity of the slender rods, the rotating means connected to the slender rods which has low rigidity may have a lower output than that of similar motors that must to be decelerated with gears or cams.

The above and other objects, features and advantages of this invention, will be apparent in the following detailed description of an illustrative embodiment thereof which is to be read in connection with the accompanying drawings wherein like reference numerals identify the corresponding parts in the several views.

DETAILED DESCRIPTION OF A PREFERRED EMBODIMENT

Referring to the drawings in detail, and initially to FIGS. 1A and 1B, a fine adjustment device 1 of a head driving apparatus which embodies the present invention will be described.

Figure 1A:
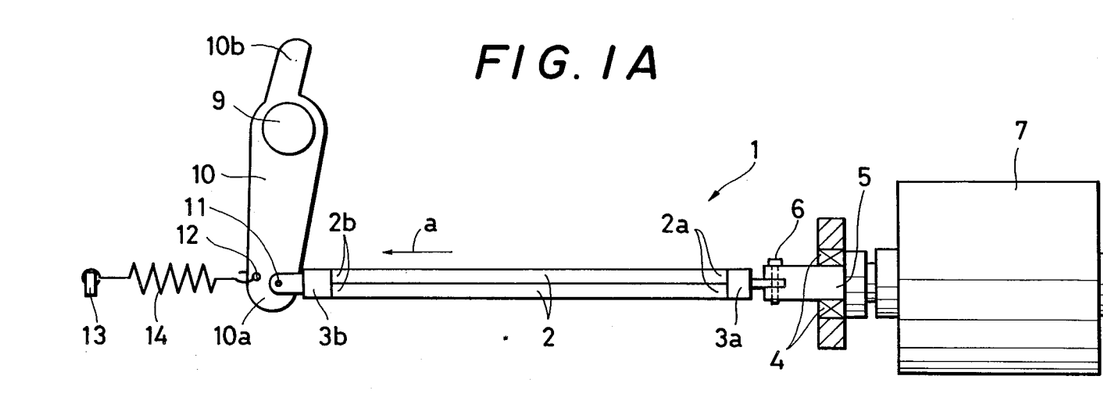
FIGS. 1A and 1B are plan views of a fine adjustment device of a head driving apparatus according to an embodiment of this invention.

As shown in FIG. 1A, two slender rods 2, such as wires or the like are fixed to each other at both ends 2a and 2b thereof with fixing members 3a and 3b, and one of the fixing members 3a is connected to the motor shaft 5 of a stepping motor 7 by a pin 6. The motor shaft 5 is supported by a thrust bearing 4, and rotatable in both forward and reverse directions, and the center line of the two slender rods 2 is in alignment with that of the motor shaft 5.

The other of the fixing members 3b is connected in a nonrotatable state to a lever 10 at one end 10a thereof with a pin 11. The lever 10 is swung on a fulcrum 9, and urged clockwise in FIG. 1A with a spring 14 set between a spring stop 12 provided in one end 10a of the lever 10 and a fixed spring stop 13, so that the slender rods 2 are stretched in a direction of arrow a.

Figure 1B:
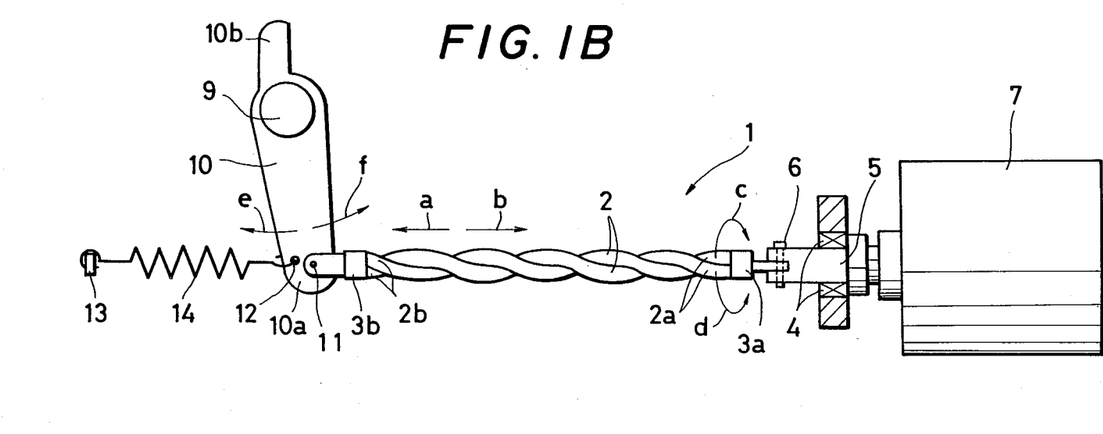

Thus, when the stepping motor 7 is driven, the slender rods 2 shown in FIG. 1A are intertwined with each other as shown in FIG. 1B, so that the slender rods 2 shorten a little and the other end 2b thereof is displaced in a direction of arrow b against the force of the spring 14. In other words, when one end 2a of the slender rods 2 is rotated in normal or reverse direction of arrows c or d, the other end 2b of the slender rods 2 is finally adjusted to its new positions.

According to the fine adjustment device 1 shown in FIGS. 1A and 1B, the lever 10 is swung on the fulcrum 9 in the direction of arrow e or f due to displacement of the other end 2b of the slender rods 2, which is larger than the displacement of the other end 10b of the lever 10.

Next, the principle of the fine adjustment device 1 will be described with reference to FIGS. 2 to 4.

Figure 2:
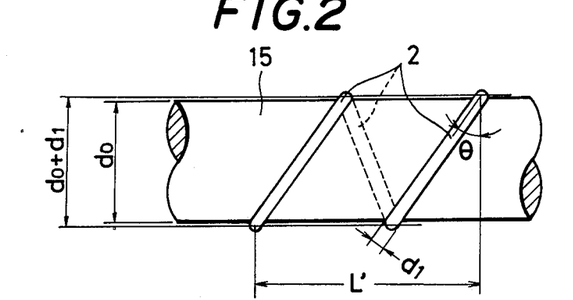
FIGS. 2 to 4 are explanatory views for the principle of the fine adjustment device of FIGS. 1A and 1B.
Figure 3:
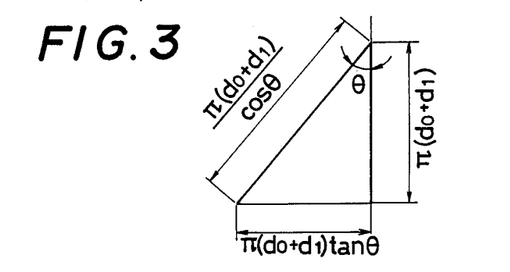

When a slender rod 2 of length L and diameter $d_1$ is wound around a circular cylinder 15 of diameter $d_0$ at an inclination $\theta(0 \leq \theta < \pi/2)$ as shown in FIG. 2, we obtain length L' shown in FIG. 2, so that with reference to FIG. 3:

$$L' = t\pi(d_0+d_1)\tan\theta$$

We also obtain $$L = t\pi(d_0+d_1)/\cos\theta$$

where L is the untwisted length of the rod 2 and t equals the turns of the slender rod 2.

$$\therefore \quad L' = t\pi d_1 \tan\theta$$
$$d_0 \to 0$$
$$L = t\pi d_1 \sec\theta$$
$$d_0 \to 0$$

Therefore, $L' = L \sin\theta$
$d_0 \to 0 d \to 0$

Figure 4:
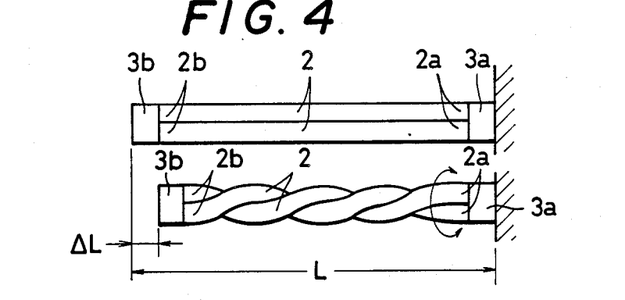

Thus, when two slender rods 2 shown in FIG. 4 are intertwined the difference $\Delta L$ in length is $$\Delta L = (L - L') = (1 - \sin\theta)L$$
$$d_0 \to 0$$

Now, floppy disk equipment embodying the present invention will be described with reference to FIGS. 5 and 6.

A motor 23 for driving a floppy disk 27 is arranged on the main chassis 22 of the floppy disk equipment 21, and a motor shaft 25 and a driving pin 26 project from a turntable 24 which is driven by the motor 23. The floppy disk 27 accommodated in a disk cartridge 28 is horizontally mounted on the turntable 24, and rotated, for example, in a direction of arrow g by the turntable 24.

A head driving apparatus 30 is also arranged on the main chassis 22 on the rear side of the motor 23, and a guide shaft 31 of the head driving apparatus 30 is horizontally fixed to the main chassis 22 through a pair of fixtures 32, which hold the respective ends of the guide shaft 31. A carriage 33 is movable in a direction of arrows h and i due to guidance of the guide shaft 31, on which a pair of bearings 33a of the carriage 33 are mounted.

A pair of magnetic heads 34 secured to the carriage 33 are inserted in a pair of upper and lower head insertion openings (not shown) of the disk cartridge 28 so as to make the magnetic heads 34 contact the upper and lower surfaces of the floppy disk 27, respectively. The magnetic heads 34 are moved by the carriage 33 in radius directions of the floppy disk 27 as indicated by arrows h and i.

A sub-chassis 35 and the guide shaft 31 are disposed on opposite sides of the carriage 33, and the sub-chassis 35 is also secured horizontally to the main chassis 22. A lead screw 36 on the sub-chassis 35 is horizontally supported in parallel with the guide shaft 31 by a pair of bearings 37 provided in the sub-chassis 35, so that it can be movable in the directions of arrows h and i and rotatable in directions of arrows j and k. A needle 38 projecting from the carriage 33 is fitted into a helical groove 36a formed on the periphery of the lead screw 36.

One end portion of the lead screw 36 forms a motor shaft 39 of a coarse stepping motor 40 which is fixed to a frame 41 that is formed integrally with the sub-chassis 35. The motor shaft 39 having a rotor 42 formed on one end is movable with the lead screw 36 in the axial direction thereof with respect to a stator 43 of the stepping motor 40, and urged in the direction of arrow h by the force of a leaf spring 45, which presses the end of the motor shaft 45 through a pivot ball 44. The frame 41 is almost T-shaped, and in the frame 41 the pair of bearings 37 are provided.

A fine adjustment device 47 is arranged on the sub-chassis 35, and two slender rods 48, such as wires or the like of the fine adjustment device 47 are fixed to each other at the both ends thereof by a pair of fixing members 49a and 49b. Further, one of the fixing members 49a is connected, through a coupling 52, to the motor shaft 51 of a fine stepping motor 50 which is fixed to the frame 41 of the sub-chassis 35, and the other of the fixing members 49b is connected in a nonrotatable state to one end 54a of a lever 54 which is swung on a fulcrum 53 in directions of arrows m and n.

The slender rods 48 are parallel to the lead screw 36, and the central line of the two slender rods 48 is in alignment with that of the motor shaft 51. Further, the lever 54 is rotatively urged in the direction of arrow n by the force of a tension spring 56 set between a pair of spring stops 55a provided at the other end 54b of the lever 54, and 55b provided on the sub-chassis 35, so that the slender rods 48 are stretched in a direction of arrow p. Further, the other end 54b of the lever 54 abuts against one end 36b of the lead screw 36 through a pivot bearing 57.

When the stepping motor 50 is driven, the fixing member 49a is rotated in a direction of arrow s or t by the motor shaft 51 through the coupling 52, so that the two slender rods 48 are intertwined and shortened a little in the direction of arrow p or q against the force of the tension spring 56. Thus, the lever 54 is swung a little on the fulcrum 53 in the direction of arrow m or n, and by the cooperative forces of the lever 54 through the pivot bearing 57, and the leaf spring 45, the lead screw 36 is moved a little in the direction of arrow h or i.

Next, the operation of the above head driving apparatus 30 will be described.

Figure 5:
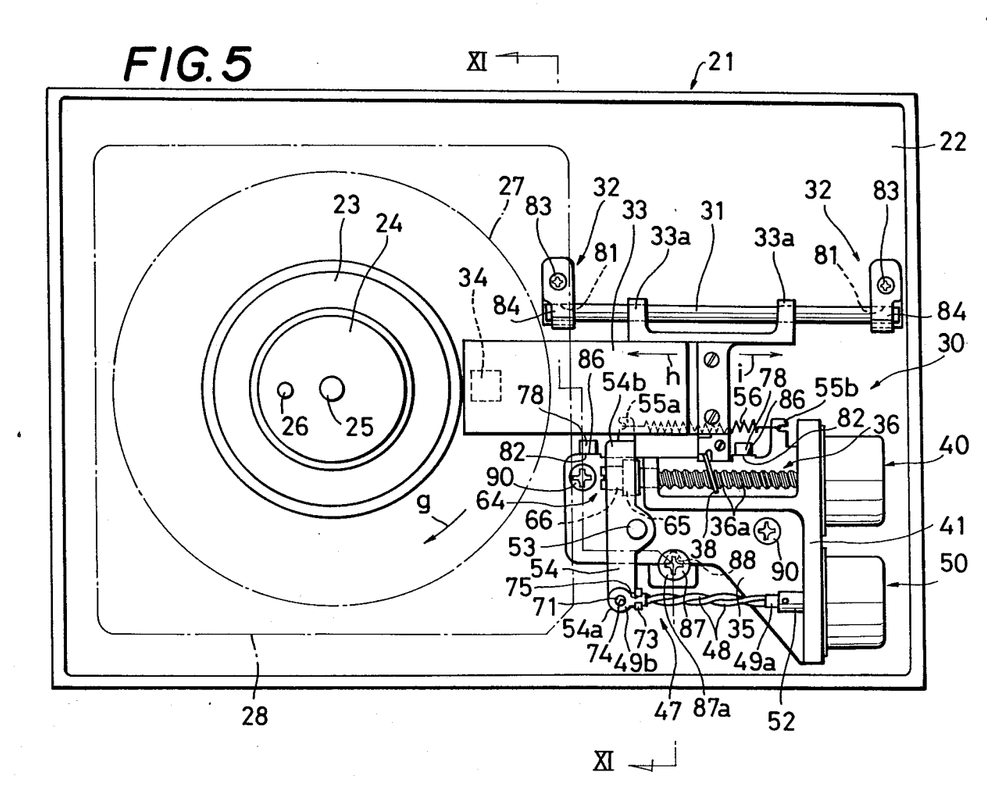
FIG. 5 is a general plan view of the head driving apparatus.

The pair of upper and lower heads 34 shown in FIG. 5 are in contact with the respective upper and lower faces of the floppy disk 27 which is driven by the motor 23 through the turntable 24. Under such a state, when the coarse stepping motor 40 is rotated in the normal or reverse direction, the lead screw 36 is rotated together with the motor shaft 39 in a direction of arrow j or k as shown in FIG. 6, so that the needle 38 is guided by the groove 36a of the lead screw 36, and the carriage 33 is coarsely displaced in the direction of arrow h or i. Thus, the pair of magnetic heads 34 abutting against the floppy disk 27 are coarsely displaced in the radius direction of the floppy disk 27, and the positional coarse adjustment of the magnetic heads 34 to the track of the floppy disk 27 is made.

Then, the fine stepping motor 50 is rotated in the normal or reverse direction due to servo control signals from the floppy disk 27, so that the fine adjustment device 47 functions as mentioned above, and the lead screw 36 is finely displaced in the direction of arrow h or i. Thus, the carriage 33 is finely displaced in the direction of arrow h or i by the lead screw 36 through the needle 38 which is guided by the groove 36a of the lead screw 36, and then, the pair of magnetic heads 34 are finely displaced in the radius direction of the floppy disk 27, so that the fine positional adjustment of the magnetic heads 34 against the track of the floppy disk 27 is accurately made.

At the time of the fine displacement of the magnetic heads 34, no noise is not made because the two slender rods 48 are only intertwined. Further, if the rigidity of the slender rod 48 is lowered, the load carried by the fine stepping motor 50 is substantially reduced.

Next, the pivot bearing 57 will be described on reference to FIGS. 7A and 7B.

The pivot bearing 57 provided at one end 36b of the lead screw 36 comprises: a pivot ball 59, the center of which is on the axis $P_1$ of the lead screw 36; and a plurality of balls 60, for example, six balls which function as balls of a ball bearing, and which are provided adjacent to the other end 54b of the lever around the axis $P_1$ and in contact with the pivot ball 59. The pivot ball 59 is fitted into a semispheric recess 61 disposed at the end 36b of the lead screw 36, and the plurality of balls 60 is held in a retainer 62 provided at the other end 54b of the lever 54.

Figure 6:
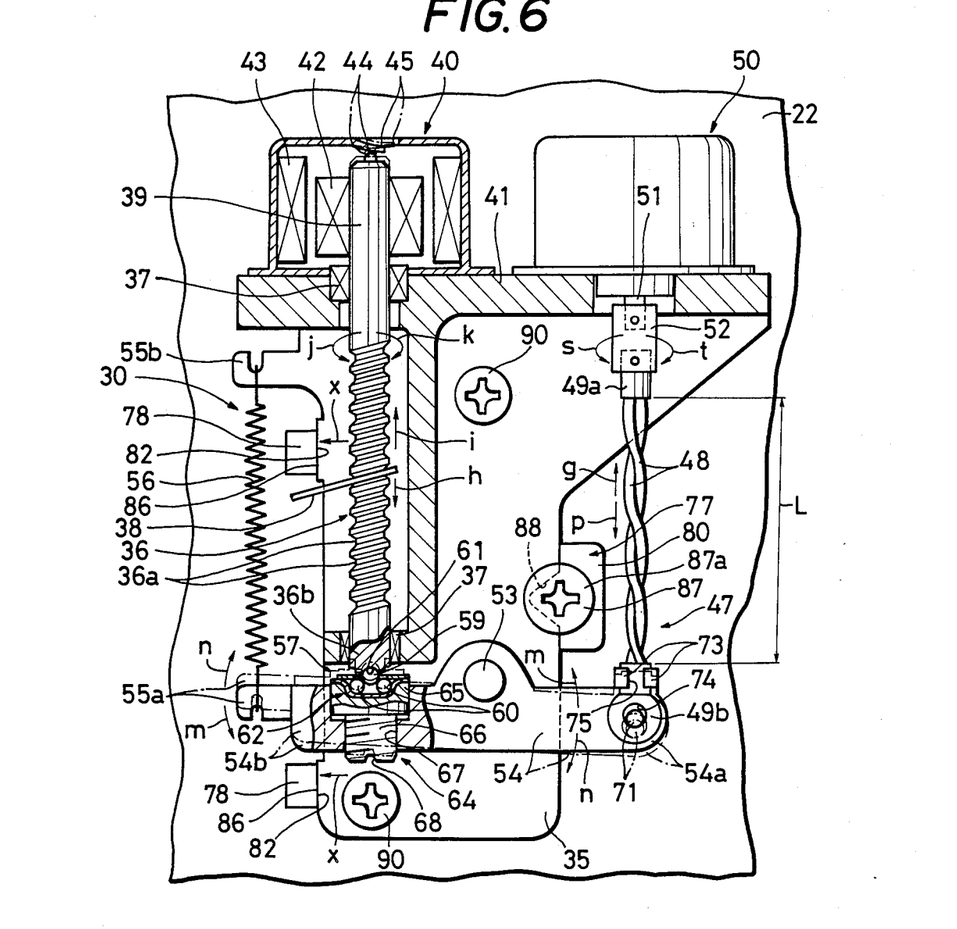
FIG. 6 is a plan view of a principal part of the head driving apparatus.

Thus, when the lead screw 36 is displaced in the direction of arrow h or i by the lever 54 which is swung in the direction of arrow m or n as shown in FIG. 6, the pivot ball 59 is in rolling contact with the plurality of balls 60, so that the mechanical loss between the lead screw 36 and the lever 54 is made very small.

Figure 7A:
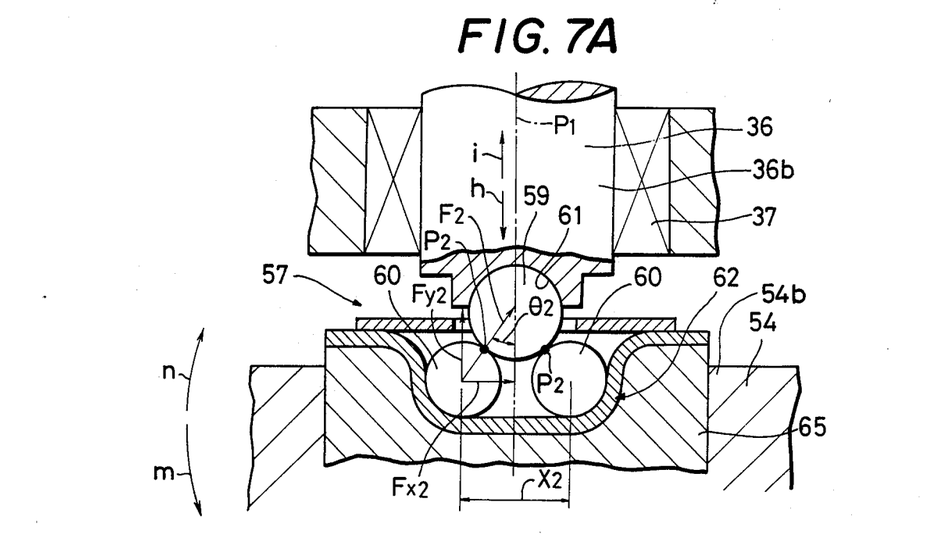
FIGS. 7A and 7B are explanatory sectional views of a pivot bearing.
Figure 7B:
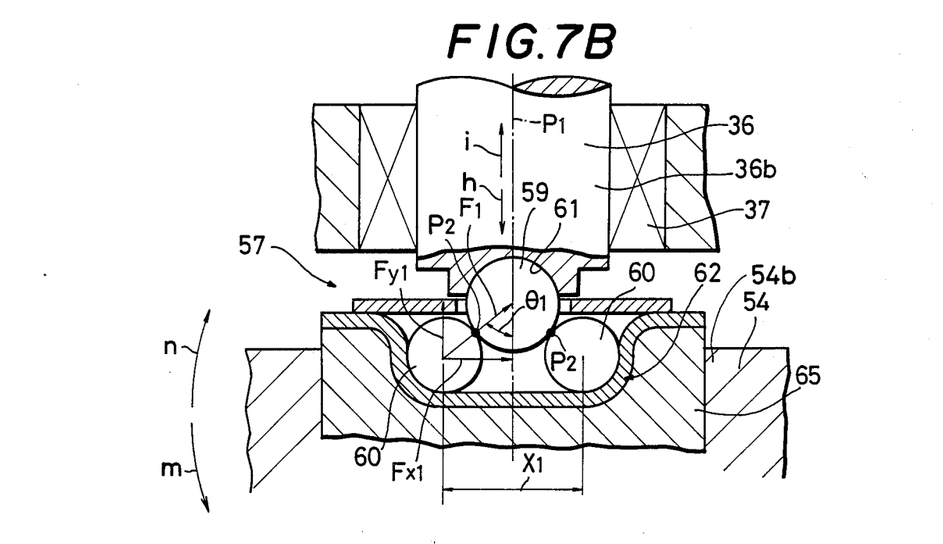

As a distance $X_1$ between centers of the balls 60 in FIG. 7B increases, an angle $\theta_1$ formed between the axis $P_1$ and the direction of a force $F_1$ which acts on the pivot ball 59 at the contact point $P_2$ between the pivot ball 59 and the balls 60, becomes larger than 45 degrees, and the component $F_{xl}$ of the force $F_l$ which is perpendicular to the axis $P_1$ becomes larger than the component $F_{yl}$ of the force $F_1$ parallel to the axis $P_1$. Therefore, in order to obtain the component $F_{yl}$ requisite for making the lead screw 36 displace in the direction of arrow i, the component $F_{x1}$ becomes larger, so that the mechanical loss between the lead screw 36 and the lever 54 increases.

In the embodiment, to make the angle $\theta_1$ smaller than 45 degrees, the distance $x_1$ is reduced as indicated at $x_2$ in FIG. 7A, so that the mechanical loss between the lead screw 36 and the lever 54 decreases, whereby it can be easy to smoothly displace the lead screw 36.

Next, a correction mechanism 64 for correcting the length L of the slender rods 48 will be described on reference to FIGS. 6 and 8.

An adjust screw 66 is formed integrally with a holder 65 in the rear side thereof: in the front side thereof, the retainer 62 is fixed. The adjust screw 66 is fitted into a tapped hole 67 provided at the other end 54b of the lever 54. Further, a slot 68 for a screwdriver is provided in the head of the adjust screw 66.

Figure 8:
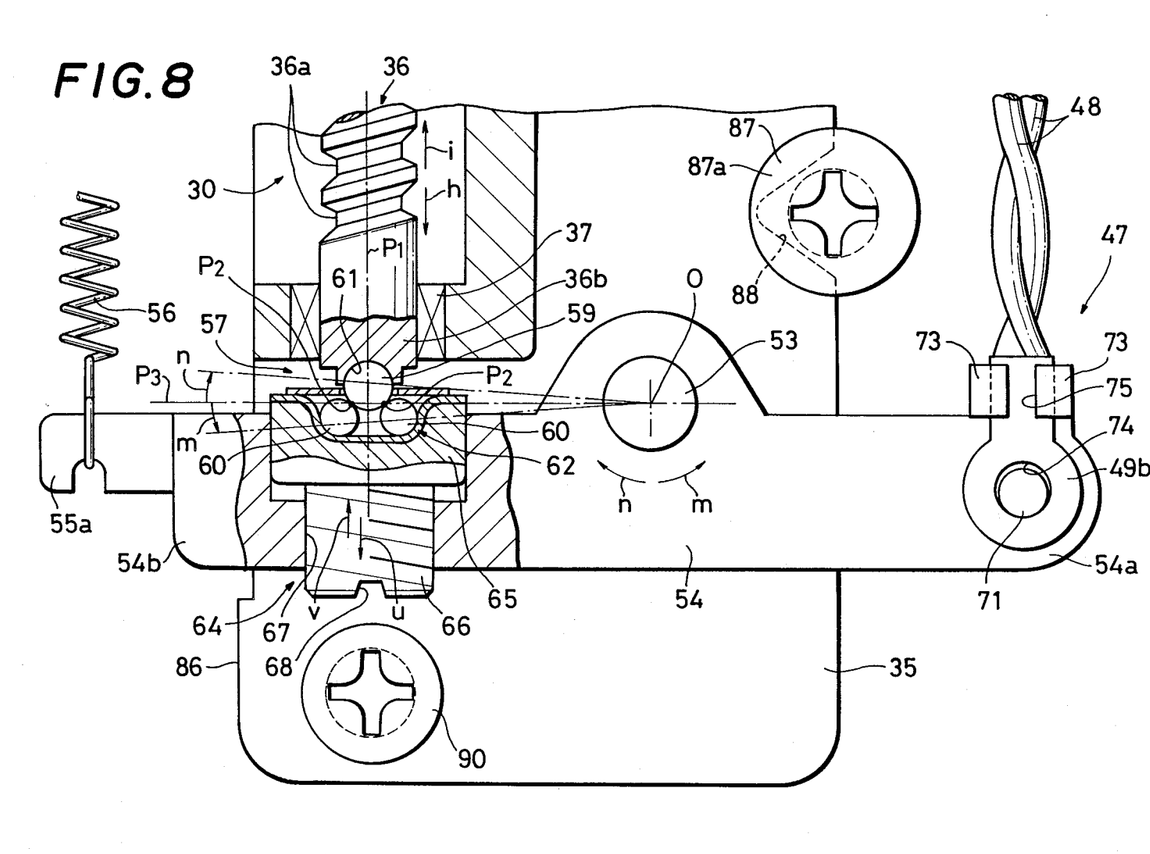
FIG. 8 is a fragmentary explanatory plan view of a correction mechanism of the fine adjustment device.

If the contact points $P_2$ are on a line $P_3$ determined in the design process, that is, on a line perpendicular to the axis $P_1$ and passing through the fulcrum 53, the lead screw 36 can be accurately and smoothly moved in the direction of arrows h and i by the lever 54 swung in the direction of arrows m and n, because balanced forces of the lever 54 act on the lead screw 36 on the upper and lower sides of the line $P_3$ in FIG. 8, but due to errors in the length L of the slender rods 48, the contact points $P_2$ are apt to move from the line $P_3$.

In the embodiment, as the length L changes the adjust screw 66 is rotated by the screwdriver or the like fitted into the slot 68 thereof, whereby the holder 65 is finely moved in direction of arrows u and v so as to bring the contact points $P_2$ on the line $P_3$. Thus, the length L of the slender rods 48 is easily corrected after the assembly of the fine adjustment device 47.

Next, means for securing the slender rods 48 to the lever 54 will be described on reference to FIGS. 9A to 9C.

Figure 9A:
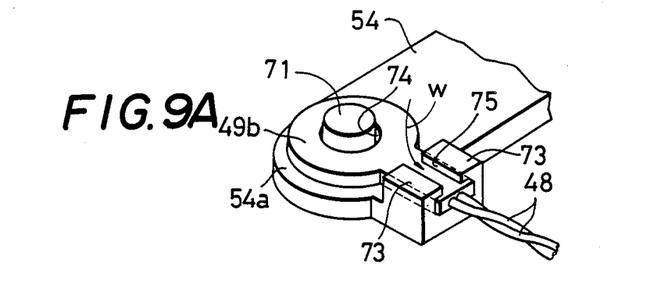
FIGS. 9A to 9C are explanatory perspective views of connections and slender rods.
Figure 9B:
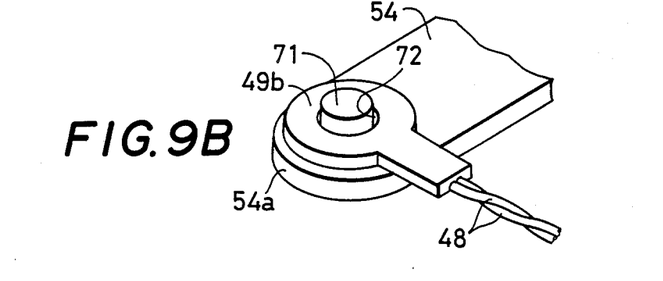
Figure 9C:
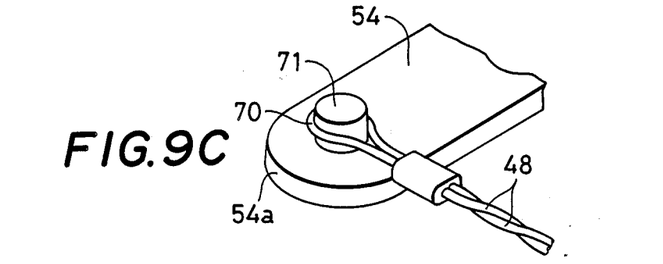

As shown in FIG. 9C, if the ends of the slender rods 48 are stretched round a pin 71 provided at the one end 54a of the lever 54 so as to make a loop 70, or as shown in FIG. 9B, if the pin 71 is fitted into a clearance hole 72 provided in the other fixing member $49_b$ which is fixed to the end of the slender rods 48, the fine adjustment device 47 is apt to have some play due to the low rigidity of the slender rods 48. Therefore, errors are apt to be produced during positional adjustment of the magnetic heads 34.

In the embodiment, not only the pin 71 but also a whirl-stop 73 are provided at the one end 54a of the lever 54 as shown in FIG. 9A, and the fixing member $49_b$ connected to the lever 54 through the pin 71 which is engaged with a hole 74 thereof is also inserted into the whirl-stop 73 as indicated by arrow w in FIG. 9A. In the whirl-stop 73, there is provided a slit 75 so as to pass the slender rods 48. Thus, the fine adjustment device 47 has no backlash at the end of the slender rods 48, and further, it is very easy to attach the slender rods 48 to the lever 54, and to detach the slender rods 48 from the lever 54.

Next, means for fixing the sub-chassis 35 to the main chassis 22 will be described on reference to FIGS. 5, 6, and 10 to 12.

Figure 10:
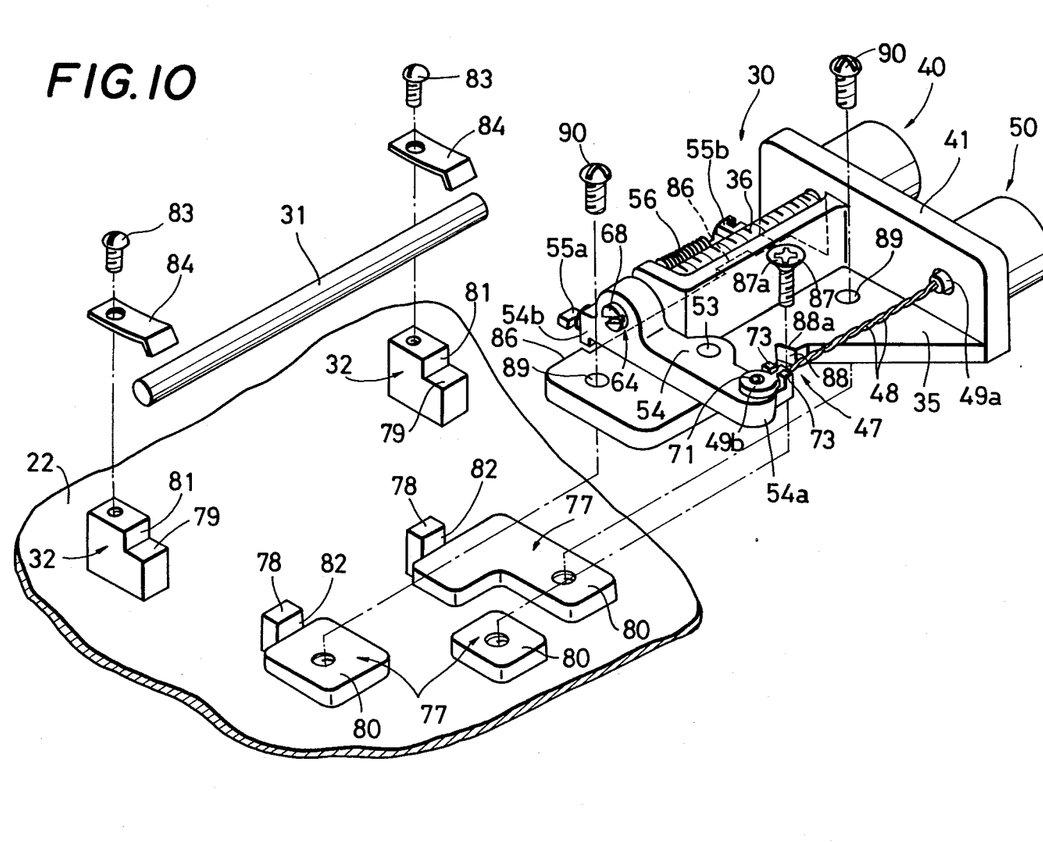
FIG. 10 is an explanatory perspective view of connections of a sub-chassis and a guide shaft with a main chassis.
Figure 11:
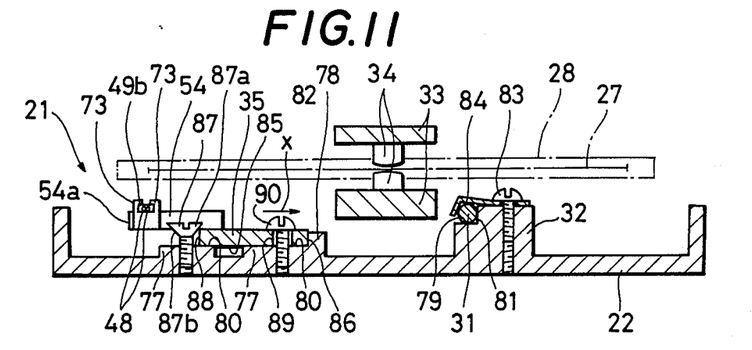
FIG. 11 is a sectional view taken along the line XI—XI on FIG. 5.

As shown in FIGS. 10 and 11, the pair of fixtures 32 for the guide shaft 31, a plurality of fixtures 77 for the sub-chassis 35, and a pair of bases 78 for proper positioning of the sub-chassis 35 are formed integrally with the main chassis 22 which is made of light metal or the like.

Further, horizontal reference planes 79 provided in the pair of fixtures 32 for the guide shaft 31, and horizontal reference planes 80 provided in the plurality of fixtures 77 for the sub-chassis 35 are simultaneously finished by the same processing method and the same manufacturing process, and vertical reference planes 81 provided in the pair of fixtures 32 and similarly, vertical reference planes 82 provided in the pair of bases 78 for proper positioning of the sub-chassis 35 are simultaneously finished by the same processing method and the same manufacturing process, s that the horizontal reference planes 79 and 80 are accurately parallel to one another, and the same may be said of the vertical reference planes 81 and 82.

Thus, the respective ends of the guide shaft 31 which are fixed to the pair of fixtures 32 by a pair of keep plates 84 with screws 83 as shown in FIGS. 5 and 11, are pressed against the horizontal reference planes 79 and the vertical reference planes 81.

Figure 12:
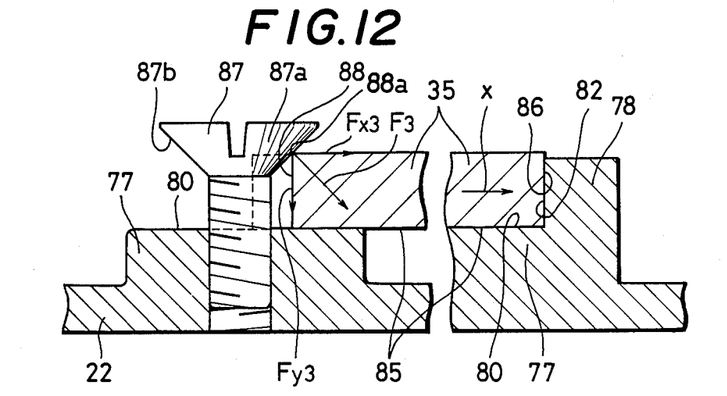
FIG. 12 is an explanatory sectional view of the connection of the sub-chassis with the main chassis.

As shown in FIG. 10, the lead screw 36, the stepping motors 40 and 50, and the fine adjustment device 47 are incorporated in the sub-chassis 35 beforehand, and then, the sub-chassis 35 are horizontally placed on the horizontal reference planes 80 of the plurality of fixtures 77 as shown in FIGS. 6, 11 and 12 so as to make the horizontal bottom face 85 of the sub-chassis 35 contact the horizontal reference planes 80.

Thereafter, a counter-sunk screw 87 is vertically screwed in the fixture 77 as shown in FIGS. 6 and 12 so as to press the tapered portion 87b of the head 87a thereof against the upper edge 88a of a V-notch 88 which is provided in one side of the sub-chassis 35, so that as shown in FIG. 12, the bottom face 85 of the sub-chassis 35 is pressed against the horizontal reference planes 80 of the fixture 77 by the vertical component $F_{y3}$ of a compressive force $F_3$, and simultaneously, a pair of vertical reference planes 86 provided in the other side, in other words, in the opposite one of the one side of the sub-chassis 35 are pressed in a direction of arrow x against the vertical reference planes 82 of the bas 78 by the horizontal component $F_{x3}$ of the compressive force $F_3$. Then, the sub-chassis 35 is surely fixed as shown in FIGS. 6 and 11 to the fixture 77 by a plurality of screws 90 inserted into respective clearance holes 89 which are provided in the sub-chassis 35.

Thus, at the time of the assembly of the apparatus, the guide shaft 31 and the lead screw 36 can be accurately mounted parallel to each other, and it is easy to put together the main chassis 22 and the sub-chassis 35, in which the lead screw 36, the stepping motors 40 and 50, and the fine adjustment device 47 are incorporated beforehand. Further, if the lead screw 36 and others are treated as a unit, it will make the maintenance of the apparatus very easy.

Having described an illustrative embodiment of this invention with reference to the accompanying drawings, it is to be understood that the invention is not limited to that precise embodiment, and that various changes and modifications may be effected therein by one skilled in the art without departing from the scope or spirit of the invention as defined in the appended claims.

According to the head driving apparatus of this invention, the fine adjustment due to intertwining of the slender rods by the motor or the like, makes no noise, so that it can be easy to make the noise of the apparatus very low. Further, as the output of the motor or the like can be made small, it can be easy to make fine adjustments promptly, even when a small-sized motor is used.

What is claimed is:

1. A head driving apparatus for displacing a head to record on and/or to reproduce from recording mediums, the head driving apparatus having coarse displacement means for coarsely displacing the head and fine displacement means for finely displacing the head from a position coarsely displaced by the coarse displacement means, the fine displacement means comprising:

a plurality of slender rods, the respective ends of said rods being affixed to one another;

rotating means for turning one end of the affixed slender rods;

urging means for applying a force urging the other end of the affixed slender rods in a direction to stretch the slender rods; and holding means for holding the other end of the affixed slender rods urged by the urging means in a nonrotatable state, wherein the one end of the affixed slender rods is turned by the rotating means to intertwine the slender rods with one another, so that the head is finely displaced in response to the fine displacement of the other end of the affixed slender rods against the force of the urging means.

2. A head driving apparatus for displacing a head to record on and/or to reproduce from recording mediums, the head driving apparatus comprising:

a lead screw to which the head is movably attached;

a first motor rotatively driving the lead screw to coarsely displace the head;

a plurality of slender rods, affixed at respective ends to one another;

a second motor for turning one end of the affixed slender rods;

urging means for applying a force to urge the other end of the affixed slender rods in a direction of stretching the slender rods;

holding means for holding the other end of the affixed slender rods proximal the urging means in a nonrotatable state; and fine drive means for finely displacing the lead screw in the axial direction thereof, the fine drive means being connected to the other end of the affixed slender rods proximal the urging means, whereby the head is coarsely displaced due to rotation of the lead screw driven by the first motor, and finely displaced in the axial direction of the lead screw due to fine displacement of the lead screw by the fine drive means connected to the affixed slender rods, when the one end of the affixed slender rods is turned by the second motor to intertwine the slender rods with one another and the other end of the affixed slender rods is finely displaced against the force of the urging means.

3. An apparatus according to claim 2, further comprising a rigid sub-chassis element for mounting the lead screw, the first motor, the plurality of slender rods, the second motor, the urging means, the holding means, and the fine drive means thereon.

4. An apparatus according to claim 3, further comprising adjustable mounting means for mounting the sub-chassis on a main chassis of the record and for reproduce apparatus.

5. An apparatus according to claim 2, wherein an end of the lead screw forms a shaft of the rotor of the first motor.

6. An apparatus according to claim 5, further comprising a spring arranged in the first motor to axially bias the shaft of the rotor.

7. An apparatus according to claim 2, wherein the fine drive means comprises a lever pivotted for rotation, one end of the lever is connected to the other end of the affixed slender rods proximal the urging means, and the other end of the lever has a push block for pushing one end of the lead screw, and the head is finely displaced by the lead screw driven in the axial direction thereof against the force of the urging means, which urges the lead screw in a predetermined direction through the lever.

8. An apparatus according to claim 7, further comprising means for preventing rotation connecting the one end of the affixed slender rods to the lever, wherein the one end of the affixed slender rods can not pivot relative to the lever.

9. An apparatus according to claim 7, wherein the length of the slender rods is corrected by an adjusting device with an adjust screw, which can displace the point of contact between the push block and the end of the lead screw in a direction of rotation of the lever.

10. An apparatus according to claim 7, wherein the push block includes a plurality of spherical bearing balls and said lead screw includes a spherical bearing ball at the end thereof and contacting said plurality of spherical bearing balls.

* * * * *

UNITED STATES PATENT AND TRADEMARK OFFICE
CERTIFICATE OF CORRECTION

PATENT NO. : 4,875,120
DATED : October 17, 1989
INVENTOR(S) : Kiyoshi Takshashi, et. al.

It is certified that error appears in the above-identified patent and that said Letters Patent is hereby corrected as shown below:

Col. 1, line 47, after "art" insert --.--

Col. 2, line 52, after "connections" insert --between a lever--

Col. 3, line 45, change "t¶dd$_1$" to --t¶d$_1$--

Col. 5, line 37, delete "not"

Col. 7, line 11, change "s" to --so--

IN CLAIMS:

Col. 10, line 9, change "claim 7" to --claim 9--

Signed and Sealed this

Sixth Day of November, 1990

Attest:

HARRY F. MANBECK, JR.

Attesting Officer     Commissioner of Patents and Trademarks